March 25, 1969     J. R. HARPER ET AL     3,434,331
VECTOR MENSURATION DEVICE, METHOD FOR ITS USE, AND
METHOD FOR ITS CALIBRATION
Filed July 5, 1966     Sheet 1 of 3
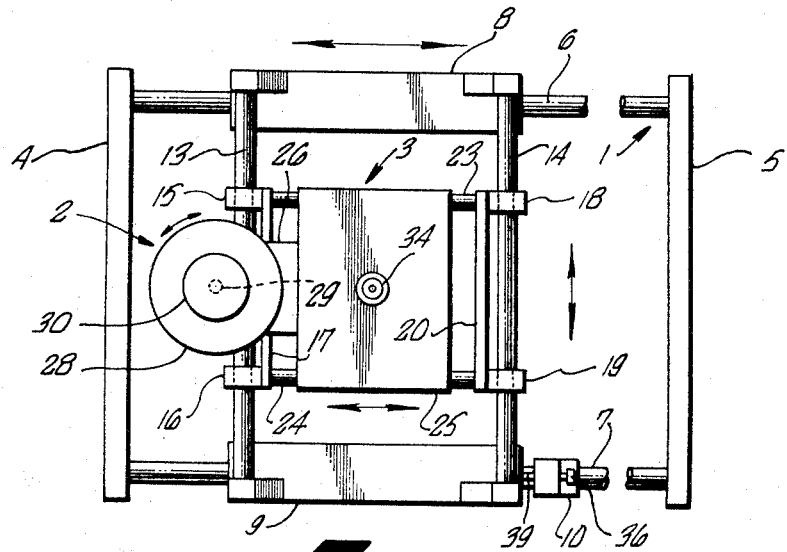
FIG_1A_
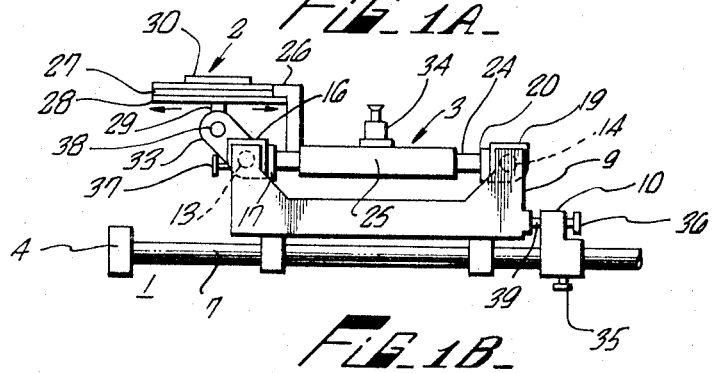
FIG_1B_
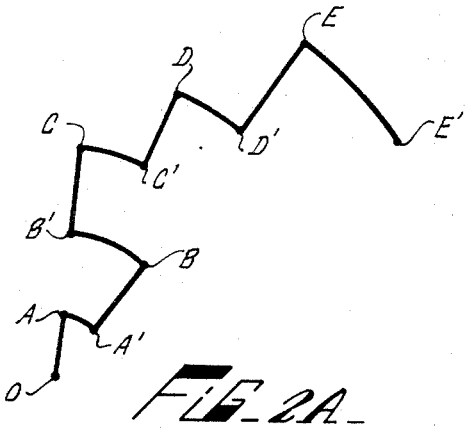
FIG_2A_
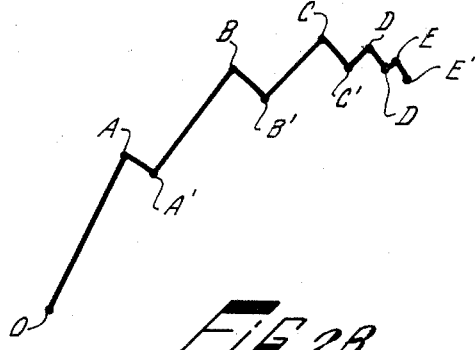
FIG_2B_
INVENTORS.
JACK R. HARPER
JAMES LOUGHLIN
BY
Christie, Parker & Hale
ATTORNEYS.

March 25, 1969 J. R. HARPER ETAL 3,434,331
VECTOR MENSURATION DEVICE, METHOD FOR ITS USE, AND
METHOD FOR ITS CALIBRATION
Filed July 5, 1966 Sheet 2 of 3
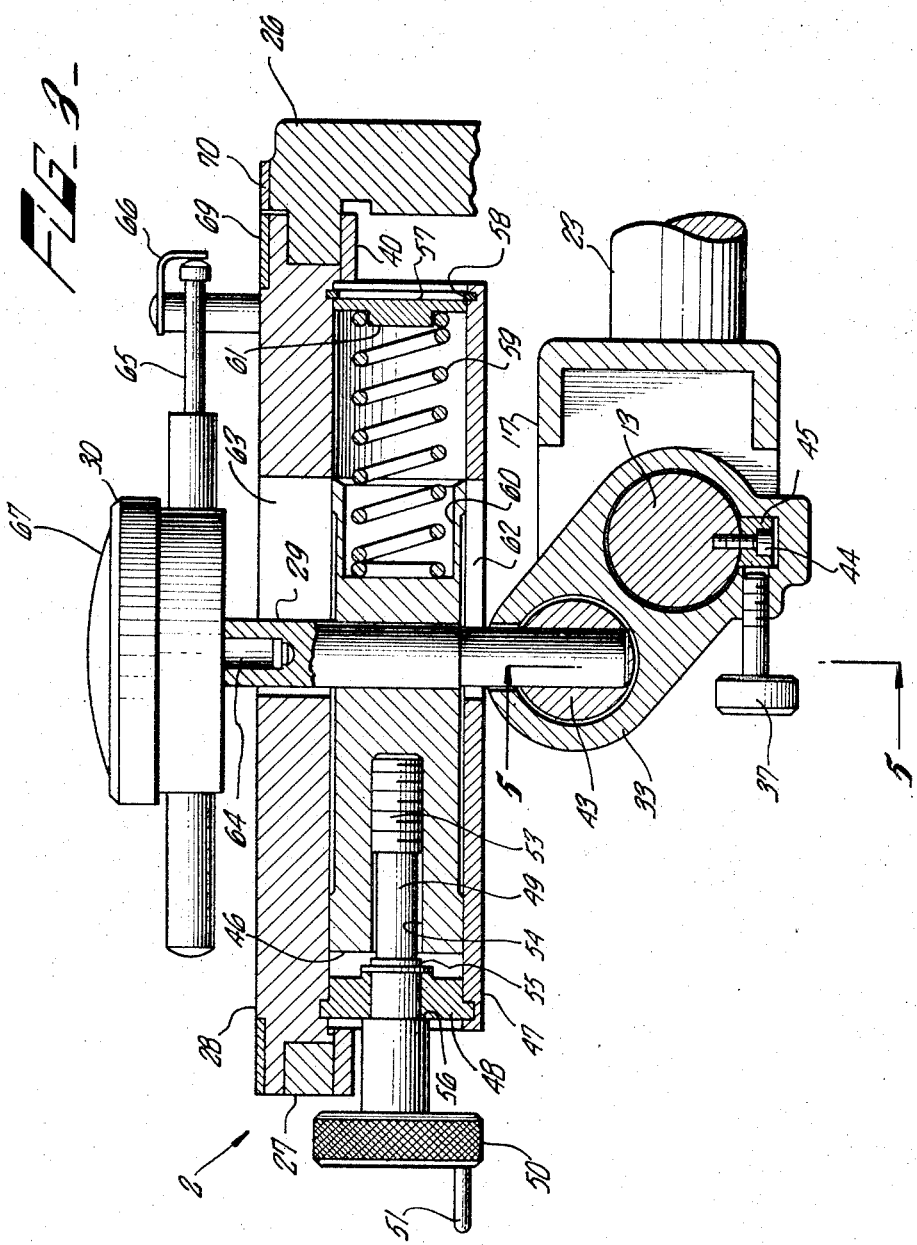
INVENTORS
JACK R. HARPER
JAMES LOUGHLIN
BY
Christie, Parker & Hale
ATTORNEYS.

United States Patent Office 3,434,331
Patented Mar. 25, 1969

3,434,331
VECTOR MENSURATION DEVICE, METHOD FOR ITS USE, AND METHOD FOR ITS CALIBRATION
Jack R. Harper, Yorba Linda, and James Loughlin, Redondo Beach, Calif., assignors to FMA, Inc., Los Angeles, Calif., a corporation of California
Filed July 5, 1966, Ser. No. 562,830
Int. Cl. G01c 25/00
U.S. Cl. 73—1
13 Claims

ABSTRACT OF THE DISCLOSURE

An apparatus and method for measuring the length and angle of lines on maps, photographs, charts, etc. A carrier carrying a microscope is movable on a frame above the line to be measured. The microscope is first positioned at a point at one end of the line and a post is then fixed on the frame in a position representative of the point. The carrier and microscope are then moved to the other end of the line and the distance and angle of movement of the microscope is indicated by means of a calibrated turret and gauge surrounding the post.

---

This invention relates to measurement and, more particularly, to a vector mensuration device, i.e., a device capable of measuring the length and/or the direction of a vector.

In the course of interpretation of photographs, particularly aerial photographs, much valuable information is extracted from the photographs by measuring the length and/or direction of lines and objects, i.e., vector quantities. For example, aircraft can sometimes be identified from a knowledge of the length of its wings and/or the angle between its wings and the fuselage.

The typical photointerpretation system includes a station, on which a microscope is mounted, and two pairs of tracks upon which the station can be moved in rectangular coordinates with respect to the photograph. To measure the distance and/or the direction of a line, station is first slid along the tracks until the cross hairs of the microscope lie directly over one end point of the line. The station is then moved by operating an X-coordinate micrometer and a Y-coordinate micrometer until the cross hairs of the microscope lie directly over the other end point of the line. The micrometer readings give the rectangular coordinates of the line, from which the length of the line is calculated with the Pythagorean theorem and the direction of the line is determined with trigonometry tables. In essence the rectangular coordinates are converted into polar coordinates with the origin at one of the end points of the line. Needless to say, the necessity for calculations gives rise to frequent errors and generally slows down the process of interpreting aerial photographs. In addition, error is introduced into the determination of the length and/or direction of a line, if the station on the tracks is not closely held to rectilinear motion, since the calculations apply only for right triangles.

Patent 2,198,757, issued Apr. 30, 1940, to H. Bohrn and L. Avanzini, discloses apparatus capable of measuring the length and/or direction of a line directly, thereby eliminating the need for calculations. Briefly, this apparatus comprises a circular plate upon which the line to be measured rests, a rotatable, elongated carrier that is diametrically disposed over the plate to measure direction with respect to the center of the plate, and a length gauge that is slidable along the carrier to measure the distance of points from the center of the plate. The apparatus of the Bohrn, et al. patent is not well-suited, however, for use in a photointerpretation system. For one thing, the apparatus is limited to a circular configuration, because the carrier circumscribes the plate as it rotates. In contrast, a rectangular configuration generally results in a more compact, easily operable photointerpretation system that makes the most efficient use of the space occupied by the apparatus, and allows for the use of long strips of film.

According to the invention, a vector mensuration device having two stations is provided. The first station includes a carrier having a reference point with respect to which the measurement is made. The second station, which is spatially removed from the first station, has first and second members that are rotatable and translatable relative to each other. Relative motion, i.e., rotation and translation, taking place between the first and second members of the second station is coupled to the first station, where this motion is followed by the reference point.

More specifically, the carrier is free to move with respect to a stationary frame in two dimensions. At the second station, a post having an axis capable of being fixed with respect to the frame or of being moved with the carrier serves as the first member and a turret surrounding the post serves as the second member. The turret is journaled within a ring integral with the carrier, so the turret rotates with respect to the carrier about the axis of the post. Furthermore, the center of the turret can be offset radially from the axis of the post, while the axis of the post remains fixed. Both radial and angular displacement of the turret are coupled to the carrier, so that the carrier follows the motion of the center of the turret with respect to the axis of the post.

Since the rotation of the carrier is effected from the second station, the shape of the carrier and the type of motion that it undergoes are not limited as in the prior art. It is found especially convenient to mount the carrier upon two approximately orthogonal pairs of tracks, although the accuracy of the determination of the length and direction of the vector is not dependent upon the pairs of tracks being orthogonal to each other.

In operation, the axis of the post is initially centered within the turret. The existence of this condition is verified by rotating the turret. If the carrier remains stationary while the turret is rotated, then the axis of the post is centered within the turret. If the axis of the post is not centered within the turret, then the carrier rotates in a circle having a radius equal to the radial displacement between the axis of the post and the center of the turret. Next, the first and second stations are moved as a single unit with respect to the frame until the reference point of the carrier lies directly over one end point of the vector to be measured. Finally, with the axis of the post fixed with respect to the frame the turret is radially displaced from and rotated about the axis of the post until the reference point of the carrier lies directly over the other end point of the vector to be measured. The radial displacement of the center of the turret from the axis of the post is the measure of the length of the vector and the angular position of the turret is the measure of the direction of the vector.

These and other features of the invention are considered further in the following detailed description taken in conjunction with the drawings, in which:

FIGS. 1A and 1B are top and side elevation views respectively, of a vector mensuration device embodying the principles of the invention;

FIGS. 2A and 2B are diagrams representing the path of a reference point on the carrier of FIG. 1;

FIG. 3 is a side elevational view partially in section of a portion of the vector mensuration device of FIG. 1 showing the second station in detail;

Figure 4:
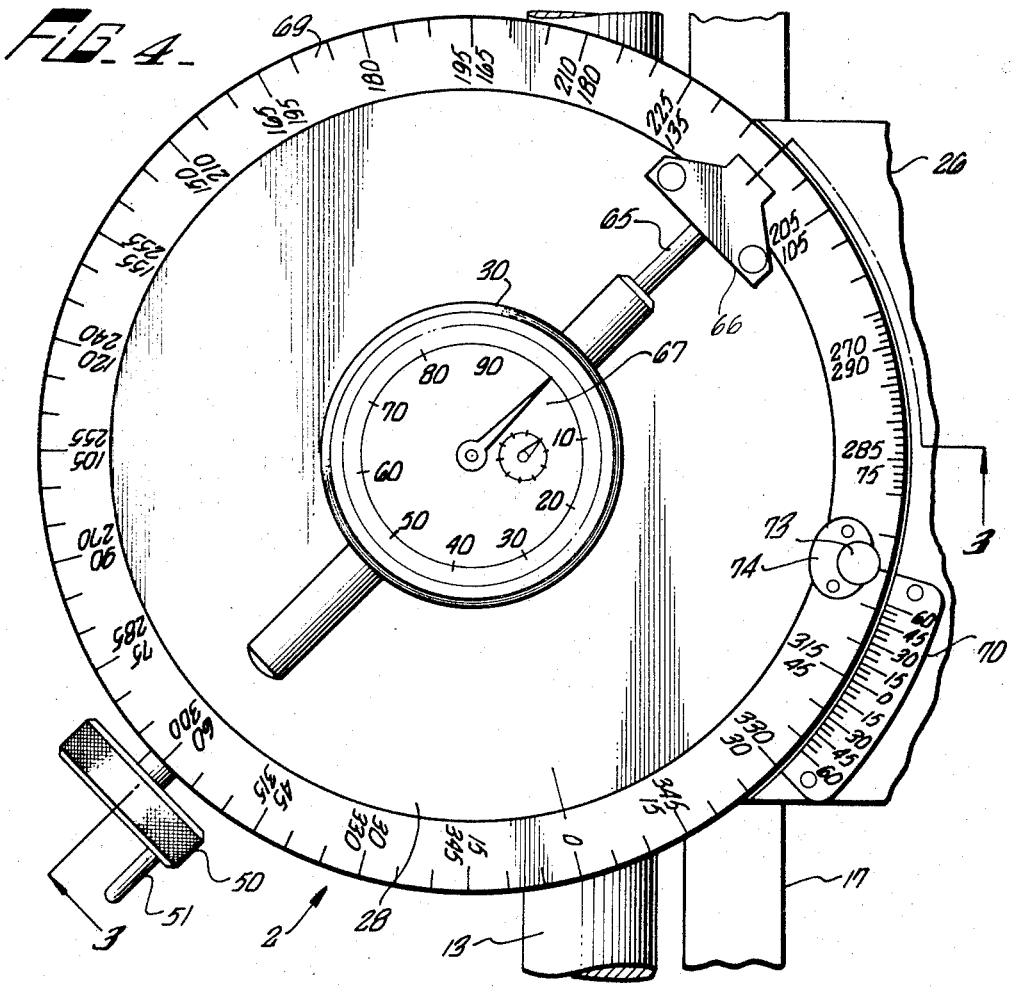
FIG. 4 is a top view of a portion of the vector mensuration device of FIG. 1, showing the second station in detail.

Reference is now made to FIGS. 1A and 1B, in which a vector mensuration device is shown comprising a stationary frame 1, a station 3, and a station 2 spatially removed from station 3. The vector to be measured, e.g., a line on an aerial photograph, would be in the plane of the drawing underneath station 3. Frame 1 has end members 4 and 5 that support tracks 6 and 7, upon which runners 8 and 9 ride together with a fine adjustment mechanism 10. Tracks 13 and 14 are supported by runners 8 and 9. Runners 15 and 16 attached to a bar 17 ride on track 13 and runners 18 and 19 attached to a bar 20 ride on track 14. A track 23 stretches between runners 15 and 18 and a track 24 stretches between runners 16 and 19 to form a support on which carrier 25 directly rides. At an arbitrary point on carrier 25, a microscope 34 is mounted. The cross hairs of the microscope constitute the reference point with respect to which the vector is measured. Integral with the main portion of carrier 25 are a vertical portion 26 and a horizontal ring portion 27.

Figure 5:
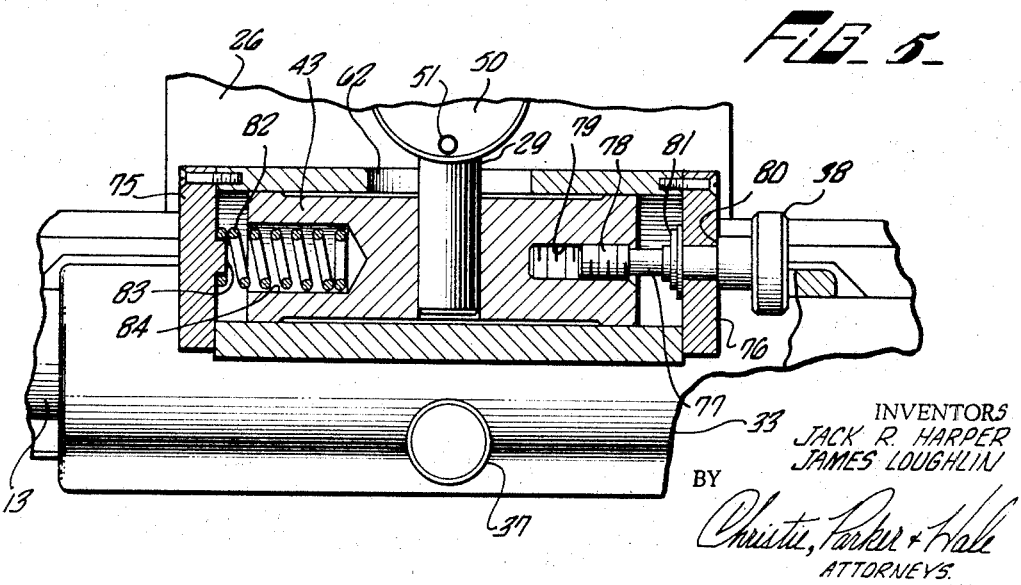
FIG. 5 is a side elevation view partially in section of the arrangement for fixing the axis of the post of the second station with respect to the frame.

At station 2, which is shown in outline in FIGS. 1A and 1B and in detail in FIGS. 3, 4, and 5, a post 29 is mounted in a runner 33. Runner 33 rides on track 13. Surrounding post 29 is a turret 28 that is journaled to rotate within ring 27. As considered in detail in connection with FIG. 3, turret 28 can be offset radially from the axis of post 29, while the axis of post 29 remains stationary. An indicator 30 measures and displays the relative radial displacement between the center of turret 28 and the axis of post 29.

To measure the length and direction of a vector, turret 28 is first adjusted by the operator until it is concentric with post 29. The existence of this condition is vertified by rotating turret 28. When post 29 is in fact concentric with turret 28, carrier 25 remains stationary, while turret 28 is rotated. But, if the axis of post 29 is offset from the center of turret 28, the reference point on carrier 25 will rotate with turret 28 in a circle having a radius equal to this offset. After post 29 and turret 28 are concentric, the operator pushes runners 8 and 9 along tracks 6 and 7, respectively, and runners 15, 16 and 18, 19 along tracks 13 and 14, respectively, until the reference point is nearly over the first end point of the vector to be measured. This step constitutes a course adjustment. At this point, a set screw 35 (FIG. 1B) is tightened to fix the position of fine adjustment mechanism 10 on track 7 and set screw 37 (FIG. 1B) is tightened to fix the position of runner 33 on track 13. The reference point on carrier 25 is brought exactly over the first end point of the vector by adjusting a knob 36 associated with fine adjustment mechanism 10 and a knob 38 associated with runner 33 until the cross hairs of microscope 34 coincide with the first end point. This step constitutes a fine adjustment. Knob 36 turns a shaft 39 that passes through the body of mechanism 10 and has a threaded fitting with runner 9. The fitting between the body of mechanism 10 and shaft 39 is such that shaft 39 can rotate with respect to element 10, but not translate. Rotation of knob 36 causes a translation of runner 9, by virtue of the threaded fitting between shaft 39 and runner 9. The construction of the mechanism for carrying out the fine adjustment along track 13 is considered in detail in connection with FIG. 5.

After the fine adjustment is made, the axis of post 29 remains fixed and the next step is to displace radially and to rotate turret 28 with respect to the axis of post 29. As the operator moves the center of turret 28 with respect to the axis of post 29, carrier 25 faithfully follows this motion. Turret 28 is moved until the reference point of carrier 25 lies exactly over the second end point of the vector to be measured, i.e., until the cross hairs of microscope 34 lie directly over the second end point of the vector. The radial displacement of the center of turret 28 from the axis of post 29 is identical to the displacement between the end points of the vector, i.e., the length of the vector, and the angular position of turret 28 is identical to the direction of the vector. While bringing the reference point over the first end point of the vector, carrier 25 moves along tracks 6 and 7 and tracks 13 and 14. After the axis of post 29 is fixed to measure the vector, carrier 25 moves along tracks 13 and 14 and tracks 23 and 24. Carrier 25 is restrained by tracks 23 and 24 from rotating in mass with turret 28, and therefore follows the path described by a radial line between the center of post 29 and the center of turret 28.

FIGS. 2A and 2B represent typical paths that the reference point on carrier 25 might track during measurement of a vector whose first end point is O and second end point is E'. These paths, which also represent the relative motion between the axis of post 29 and the center of turret 28, have radial and arc-shaped components. Radial displacement of the center of turret 28 from the axis of post 29 results in radial components O—A, A'—B, B'—C, C'—D, and D'—E, while rotation of turret 28 results in arc-shaped components A—A', B—B', C—C', D—D', and E—E'. Regardless how devious the path between point O and point E' is, the algebraic sum of the radial components is equal to the radial distance between point O and point E', i.e., the radial displacement between the axis of post 29 and the center of turret 28. The algebraic sum of the arc lengths (angles) is equal to the arc length between point A and point E', i.e., the angular displacement of turret 28. Thus the polar coordinates of point E' with point O as the origin are represented by the displacement, radial and angular, of the center of turret 28 from the axis of post 29. The stepped paths shown in FIGS. 2A and 2B would result by alternately displacing turret 28 radially and angularly. If turret 28 were simultaneously displaced radially and angularly, the paths would be continuous curves, but the radial distance between point O and point E' and the arc length traveled would remain the same.

Reference is made to FIGS. 3 and 4 for the details of construction of station 2. As mentioned in connection with FIGS. 1A and 1B, member 26 and ring 27 are integral with carrier 25. Journaled for rotation within ring 27 are turret 28 and an annular member 40 attached thereto. The lower end of post 29 fits into a slidable elongated member 43 shown as a cylinder. The fitting permits rotation of post 29 within cylinder 43 with the axis of post 29 being fixed. As described further in connection with FIG. 5, slidable cylinder 43 provides a fine adjustment for the axis of post 29 and carrier 25 along tracks 13 and 14. A key 45 fitting in a keyway in runner 33 is attached to track 13 by screws such as 44. To fix runner 33 prior to fine adjustment, set screw 37 is tightened down against key 45. The linear displacement between the axis of post 29 and the center of turret 28 is brought about by an elongated member 46 shown as a cylinder. Cylinder 46 is slidable within a housing 47 that surrounds and supports it. Post 29 passes through cylinder 46, having a tight, immovable fitting therewith. Housing 47 is attached to the bottom side of turret 28 by brackets (not shown).

Members 43 and 46 need not be cylinders. For example, a dove-tail slide member could be used.

A cap 48 terminates housing 47 at one end, forming a tongue-and-groove-like fitting with housing 47 and turret 28. A shaft 49 passes through cap 48. Shaft 49 has a knob 50 at one end with a crank 51 to facilitate turning. At the other end, shaft 49 has a threaded portion 53 that mates with internal threads in a bore 54 within cylinder 46. The fitting between shaft 49 and cap 48 permits rotation, but shaft 49 is fixed against axial motion by a fastener 55 and an annular surface 56 formed at the point of a step down in the diameter of shaft 49.

Housing 47 is terminated at the other end by a cap 57 held in place by a retaining ring 58. One end of a compression spring 59 is seated over a protruding portion 61 of cap 57. Compression spring 59 extends along housing 47 and into a recess 60 in slidable cylinder 46. As a result of this arrangement, slidable cylinder 46 remains spring-loaded at all times. A slot 62 in housing 47 and a slot 63 in turret 28 permit radial displacement between the axis of post 29 and the center of turret 28.

As the operator turns crank 51, this rotational motion is transformed into translational motion at the threaded fitting between portion 53 and bore 54 of slidable cylinder 46. Translation of slidable cylinder 46 linearly displaces turret 28 radially from the axis of post 29, which is fixed. A mount 64 of a length gauge of a commercially available type serving as indicator 30 is imbedded in post 29. A spring-loaded, movable arm 65 of the length gauge, the extension of which is the length measured by indicator 30, rests against a bracket 66 fastened to turret 28. Thus, relative radial displacement between the center of turret 28 and the axis of post 29 is accompanied by an identical displacement of arm 65, which is registered on a dial face 67 of indicator 30 (FIG. 4). The operator of the vector mensuration device ascertains the angular position of turret 28 by referring to a dial 69 inlaid in turret 28 and a vernier scale 70 inlaid in vertical member 26.

A detent 73 (FIG. 4) held to turret 28 by a bracket 74 permits conversion of the vector mensuration device of the invention to permit measurement of linear displacement in a rectangular coordinate system, as in the prior art devices. Detent 73 protrudes through turret 28 almost to the edge of ring 27. Two holes in ring 27 (not shown) are spaced 90° from one another such that, when detent 73 is over the one hole, cylinder 46 is aligned with tracks 13 and 14, and, when detent 73 is over the other hole, cylinder 46 is aligned with tracks 23 and 24. To operate the vector mensuration device in this mode, turret 28 is first rotated until detent 73 is over one of the holes. Detent 73 is then unlatched and permitted to drop into hole, thereby preventing further rotation of turret 28.

Althought in the specific embodiment of FIG. 3 post 29 rotates with turret 28 and only the axis of post 29 is actually fixed, post 29 could in some embodiments of the invention be completely fixed and the rotation could take place at some other point in the link between post 29 and turret 28. As one example, a micrometer could serve to actuate displacement of turret 28 with respect to post 29, and to measure the displacement. A sphere would be fixed on top of post 28. The movable shaft of the micrometer and a spring-loaded arm would be in horizontal alignment on diametrically opposite sides of the sphere. The micrometer housing and the housing for the arm would be fastened to the turret, so that the shaft and arm would rotate about the sphere as the turret is rotated and the center of the curret would be displaced from the axis of the post as the micrometer is operated.

Reference is now made to FIG. 5 for the details of the construction of runner 33. A slidable cylinder 43 is surrounded and supported by runner 33. Caps 75 and 76 cover the ends of the portion of runner 33 housing cylinder 43. A shaft 77 extends through cap 76. At one end, shaft 77 has a threaded portion 78 that mates with an internal thread in a bore 79 of slidable cylinder 43. Shaft 77 is terminated at the other end by knob 38. The fitting of shaft 77 with cap 76 is such that rotation is permitted, but axial movement of shaft 77 is prevented by a fastener 81 and the annular surface 80 formed at a step down of the diameter of shaft 77. One end of a compression spring 82 is seated over a protruding portion 83 of cap 75. Compression spring 82 extends into a recess 84 in slidable cylinder 43, such that cylinder 43 remains spring-loaded. After a course adjustment of runner 33 on track 13 is made, knob 37 is tightened. Then, knob 38 is turned to displace slidable cylinder 43. This effects a fine adjustment of the position along track 13 of the axis of post 29 and with it carrier 25.

Although the vector mensuration device has been disclosed in the context of a photointerpretation system, it has general applicability to the measurement of distances and/or angles. Alternatively, the apparatus can be used to plot a predetermined course given in terms of distance and direction, for example, in performing a metal-cutting operation. In this case, a metal-cutting tool would replace microscope 34 and the operator would turn crank 51 and orient turret 28 to steer the cutting edge along a predetermined path determined by a pattern.

What is claimed is:

1. Apparatus for measuring the length and/or direction of a line comprising: a first station having a reference point that is to coincide with one end point of the line at the beginning of the measurement and with the other end point of the line at the end of the measurement; a second station spatially removed from the first station, the second station having a post and a turret that are rotationally and translationally movable relative to each other; and a ring integral with the first station for coupling relative movement taking place between the post and the turret of the second station to the first station, so that the reference point follows this movement, the turret being journaled within the ring.

2. A vector mensuration device comprising: a stationary support; a first station movable in two dimensions with respect to the support; a second station movable with the first station with respect to the support, the second station having a first element with an axis that is fixable with respect to the support and a second element that is rotatable and translatable with respect to the axis of the first element; and means with the axis of the first element fixed with respect to the support for transmitting rotation and translation of the second element with respect to the support to the first station such that a reference point on the first station undergoes an identical translation and rotation with respect to the support.

3. A vector mensuration device comprising: a stationary frame; a carrier movable in two dimensions with respect to the frame; a post movable with the carrier; a turret movable with the carrier, the currret surrounding the post and being rotatable with respect to its axis; means capable of displacing the center of the turret radially without moving the axis of the post; and means for coupling rotation and radial displacement of the turret with respect to the axis of the post to the carrier, so that a reference point on the carrier follows the rotation and radial displacement of the turret.

4. The device of claim 3, in which the coupling means comprises a ring fixed to the carrier, the turret being journaled to rotate within the ring.

5. The device of claim 3, in which the post is held by a fixable support that moves with respect to the frame, the fitting between the support and the post being such that the post is rotatable with respect to the support, and the means capable of displacing the center of the turret radially has a tight immovable fitting with the post such that the post rotates with the turret.

6. The device of claim 5, in which the means capable of displacing the center of the turret is an elongated member through which the post passes, the member having a housing fixed to the turret and being positively slidable within its housing responsive to adjustment.

7. The device of claim 3, in which means are provided for indicating the radial displacement of the center of the turret with respect to the axis of the post.

8. The device of claim 3, in which means are provided for indicating the rotation of the turret with respect to the axis of the post.

9. The device of claim 3, in which the post is supported by a slidable, elongated member having a housing that is movable with the carrier, the member being positively positionable within its housing responsive to adjustment and the housing being fixable with respect to the frame independent of the carrier.

10. The device of claim 3, in which means are provided for alternatively fixing the turret in one of two orthogonal rotational positions.

11. The method for measuring the length and/or direction of a line with the vector mensuration device of claim 3 comprising the steps of: displacing the center of the turret radially with respect to the axis of the post until the carrier remains stationary during rotation of the turret; moving the carrier, turret, and post as a single unit until a reference point on the carrier lies over one end point of the line to be measured; and rotating the turret and displacing it radially without moving the axis of the post until the reference point lies directly over the other end of the line.

12. The method of claim 11 comprising the additional step of measuring the radial displacement of the center of the turret with respect to the axis of the post.

13. The method of calibrating the vector mensuration device of claim 3 comprising the step of: displacing the center of the turret radially with respect to the axis of the post until the carrier remains stationary during rotation of the turret.

References Cited

UNITED STATES PATENTS

| 2,706,855 | 4/1955 | White | 33—1 |
| 3,016,612 | 1/1962 | Lynott | 33—1 X |
| 3,165,834 | 1/1965 | Benton | 33—1 |

S. CLEMENT SWISHER, *Primary Examiner.*

U.S. Cl. X.R.

33—1